US007902519B2

(12) United States Patent
Orr

(10) Patent No.: US 7,902,519 B2
(45) Date of Patent: Mar. 8, 2011

(54) MONITORING

(75) Inventor: Christopher Henry Orr, Cumbria (GB)

(73) Assignee: VT Nuclear Services Limited, Southampton, Hampshire (GB)

( * ) Notice: Subject to any disclaimer, the term of this patent is extended or adjusted under 35 U.S.C. 154(b) by 195 days.

(21) Appl. No.: 12/100,328

(22) Filed: Apr. 9, 2008

(65) Prior Publication Data

US 2008/0188704 A1    Aug. 7, 2008

Related U.S. Application Data

(63) Continuation of application No. 11/286,103, filed on Nov. 22, 2005, now abandoned.

(30) Foreign Application Priority Data

Nov. 23, 2004  (GB) ................................ 0425736.6

(51) Int. Cl.
    *G01T 1/167* (2006.01)
(52) U.S. Cl. ........................................ 250/393
(58) Field of Classification Search .................. 250/394, 250/252.1, 393, 363.01, 391, 376
    See application file for complete search history.

(56) References Cited

U.S. PATENT DOCUMENTS

| 6,452,992 | B1 * | 9/2002 | Umiastowski | ................ | 376/170 |
| 6,740,887 | B1 * | 5/2004 | Parvin et al. | ................ | 250/393 |
| 6,806,475 | B1 * | 10/2004 | Lightfoot et al. | ............ | 250/395 |
| 7,479,628 | B1 * | 1/2009 | Yeh et al. | ................... | 250/252.1 |
| 2002/0163988 | A1 * | 11/2002 | Nisius et al. | ................... | 376/245 |
| 2003/0205677 | A1 * | 11/2003 | Caldwell et al. | ............. | 250/395 |

FOREIGN PATENT DOCUMENTS

| EP | 1 176 431 A1 | 1/2002 |
| JP | 5-232238 A | 9/1993 |
| JP | 6-160539 A | 6/1994 |
| WO | WO 98/53341 | 11/1998 |

OTHER PUBLICATIONS

Filβ P.; Relation Between the Activity of a High-Density Waste Drum and its Gamma Count Rate Measured with an Unshielded Ge Detector; Aug. 1995; Applied Radiation and Isotopes; vol. 46 Issue 8; pp. 805-812.*

(Continued)

*Primary Examiner* — David P Porta
*Assistant Examiner* — David S Baker
(74) *Attorney, Agent, or Firm* — Workman Nydegger

(57) ABSTRACT

The method includes providing the volume of waste in a monitoring space; providing a support, the support being provided with a plurality of detectors for radioactive material; monitoring the volume of waste for radioactive material, in one or more parts, to give a monitoring results; and correcting the monitoring result for geometry and/or attenuation to give a corrected result using a correction factor. The correction factor is obtained by a method that includes providing a simulation of an equivalent volume of waste free of radioactive material in an equivalent monitoring space, with equivalent detectors; providing a known activity radioactive source at one or more positions in the volume of waste; determining the detector response to the source in a position, a comparison of the response and known activity contributing to a correction function for that equal volume, one or more such correction functions providing the correction factor.

30 Claims, 6 Drawing Sheets

OTHER PUBLICATIONS

Liang J.H., Jiang S.H., Chou J.T., Chen C.C., Lin S.W., Lee C.H., Chiou S.T.; Parametric Study of Shell Source Method for Calibrating Radwaste Radioactivity Detection Systems; Apr. 1998; Applied Radiation and Isotopes; vol. 49 Issue 4; pp. 361-368.*

Satoru Kawasaki et al., *Radioactivity Measurement of Drum Package Waste by a Computed-Tomography Technique*, International Journal of Radiation Applications and Instrumentation: Part A, Applied Radiation and Isotopes, vol. 41, No. 10/11, Jan. 1990, pp. 983-987.

Jenq-Horng Liang et al., *Parametric Study of Shell-Source Method for Calibrating Radwaste Radioactivity Detection Systems*, Applied Radiation and Isotopes, vol. 49, No. 4, 1998, pp. 361-368.

L. Dinescu et al., *On the Efficiency Calibration of a Drum Waste Assay System*, Nuclear Instruments and Methods in Physics Research A, vol. 487, 2002, pp. 661-666.

O. Sima et al., *Efficiency Calibration of High Volume Samples Using the GESPECOR Software*, Applied Radiation and Isotopes, vol. 61, 2004, pp. 123-127.

*Modular Gamma Box and Container Counter*, Canberra Industries, Inc., Oct. 2004.

* cited by examiner

US 7,902,519 B2

MONITORING

CROSS-REFERENCE TO RELATED APPLICATIONS

This application is a continuation of application Ser. No. 11/286,103, filed Nov. 22, 2005, which claims the benefit of United Kingdom Patent Application No. 0425736.6 filed on Nov. 23, 2004, the disclosure of which is incorporated herein by reference.

BACKGROUND OF THE INVENTION

1. The Field of the Invention

This invention concerns improvements in and relating to monitoring, particularly, but not exclusively in relation to waste, including radioactive material, within containers.

2. The Relevant Technology

In a variety of situations volumes of radioactive waste need to be consigned to storage facilities. As a part of that process there is a need to quantify the activity of the radioactive waste.

SUMMARY OF THE INVENTION

The present invention has amongst its aims to provide a more accurate measurement of the radioactive material in containers and/or to productivity and throughput for a monitoring process and/or to increase safety for a monitoring process, for instance by reducing the dose to operators.

According to a first aspect of the present invention we provide apparatus for monitoring a volume of waste for radioactive material, the apparatus comprising:
  a support, the support extending around at least two, preferably at least three, sides of a monitoring space, the support being provided with a plurality of detectors for radioactive material;
  a mover, the mover providing relative movement between the support and the monitoring space.

According to a second aspect of the present invention we provide a method of monitoring a volume of waste for radioactive material, the method comprising:
  providing a volume of waste in a monitoring space;
  providing a support extending around at least two, preferably at least three, sides of the monitoring space, the support being provided with a plurality of detectors for radioactive material;
  providing the support at a first position relative to the monitoring space by use of a mover and monitoring at least a part of the volume of waste for radioactive material from the first position;
  providing the support at one or more further positions relative to the monitoring space by use of the mover and monitoring at least a part of the volume of waste for radioactive material from each of the further positions, the at least a part of the volume of waste being at least partially different between positions.

The first and/or second aspects of the present invention may include any of the features, options or possibilities set out elsewhere in this document, including in particular from amongst the following.

The monitoring may provide information on the radioactive material present. The information may be expressed relative to one or more thresholds. The information may indicate the waste is Low Level waste. The information may be expressed as an activity and/or activity level, particularly a measurement thereof. The activity may be a total activity. The activity level may be a total activity level. The activity level may be the activity level of one or more isotopes. The information may be a mass of radioactive material. the information may be the specific activity.

The volume of waste may be provided in a container. The container may be of a standard size from amongst one or more standard sizes. The container may be an ISO FREIGHT container. The container may be a half height ISO FREIGHT container. The container may be a third height ISO FREIGHT container. The container may be rectilinear in shape. The container may be between 2 and 10 metres long, for instance 5 to 7 metres long. The container may be between 1 and 6 metres wide, for instance 2 to 3.5 metres wide. The container may be between 1 and 6 metres high, for instance between 2 and 3.5 metres high or between 1 and 2 metres high. The container may contain over 10 tonnes of waste. The container may have two side walls, two end walls and a base. The container may be open at the top. A lid for the container may be provided.

The waste may be uncompactable waste. The waste may be waste that in a high force compactor has a volume that cannot be reduced by more than 30% compared with the initial volume. The waste may include one or more of ferrous metal, steel, aluminum, wood, soil, concrete, rubble, plastics, pipes and the like. The waste may have a bulk density of between 0.4 and 1.7 gcm-3 or between 0.7 and 1.5 gcm-3.

The waste may be formed of one or more different waste types. The waste may be formed of one or more different zones, a different zone containing or being formed from a waste type. A waste type may be defined by the material it is formed from, for instance soil. A waste type may be defined by the source of that material, for instance waste arising from neutron activation.

The radioactive material may include one or more isotopes with emissions of gamma energy between 400 and 1200 keV. The radioactive material may include Cs137 and/or Co60. The support may be a framework or gantry. Preferably the framework has a first portion and a second portion at substantially 90o to the first portion. Preferably the framework has a third portion at substantially 90o to the second portion. The first portion and third portion are preferably parallel to one another. Preferably a U-shaped support is provided.

The support may extend below the monitoring space and above the monitoring space. The support above and below the monitoring space may be linked or may be separate. The support may extend up either side of and above the monitoring space. The support may extend above and below the monitoring space and up one or both sides thereof. The support may extend up either side and below the monitoring space.

The monitoring space may be the volume occupied by the waste, preferably in a container, during monitoring. The monitoring space may be above a surface on which the container rests during monitoring. The monitoring space may be a volume which is substantially rectilinear. The cross-section of the monitoring space is preferably smaller than the cross-section of the support, the cross-sections being considered perpendicular to the direction of movement.

One or more detectors, preferably one, may be provided on one side of the support, for instance on a portion of the support. One or more detectors, preferably one, may be provided on the other side of the support. One or more, preferably a plurality, more preferably at least four, detectors may be provided on the top and/or the bottom of the support. The detectors may be regularly spaced down the sides and/or across the top and/or bottom of the support.

One or more detectors, preferably one, may be provided to one side of the monitoring space. One or more detectors, preferably one, may be provided to the other side of the monitoring space. One or more detectors, preferably a plurality, more preferably at least four, detectors may be provided across the top and/or across the bottom of the monitoring space. A detector may be provided at a mid height position relative to the monitoring space on one or both sides of the monitoring space. A detector may be provided at a mid height position relative to the height of a volume of waste and/or container therefor on one or both sides of the monitoring space. The detectors provided above and/or below the monitoring space may be evenly spaced across the monitoring space. The detectors provided above and/or below a volume of waste and/or container therefor may be evenly spaced across the volume of waste and/or container therefor.

The positions of one or more detectors on the support may be adjustable, for instance to be suitably positioned for different waste volumes.

The detectors may be identical to one another. The detectors are preferably gamma detectors. The detectors may include NaI crystals. The detectors may be collimated. A collimator defining a conical field of view may be provided. The detectors may particularly be provided according to the third and/or fourth aspects below.

One or more further detectors may be provided which are differently configured to the detectors. The one or more further detectors may particularly be provided according to the seventh and/or eighth aspect below.

The mover may be provided as a part of the support. The mover may comprise a motor to propel the support. The mover may move the support along one or more rails. A rail to either side of the monitoring space may be provided. Preferably the mover can move the support from a position in front of one end of the monitoring space to a position beyond the other end of the monitoring space.

The mover may be provided as a part of the monitoring space. In particular, the mover may act on the volume of waste, more preferably a container containing the waste, to move the waste past the support. Preferably the mover can move the waste from a position in front of the support, past the support to a position beyond the support.

The relative movement of the support and the monitoring space may be provided by moving the support past the monitoring space and/or the monitoring space past the support.

The first monitoring position may position the support closest to a first part of the volume of waste. The first part of the waste may be that part of the waste at one edge of the volume of waste and/or at one edge of the container therefor, particularly the lead edge relative to the direction of movement.

The monitoring may include the detection of one or more types of emission. A type of emission may be an emission of a particular energy. A type of emission may be an emission from a particular isotope. Preferably emissions from Cs137 and Co60 are monitored. The emissions monitored may be corrected for attenuation and/or geometry. The emissions may particularly be corrected according to the fifth and/or sixth aspects below. The counts from the detectors may be considered together. The counts from the detectors may be considered separately, and in particular according to the ninth and/or tenth aspects below.

The one or more further monitoring positions may position the support closest to one or more further parts of the volume of waste. The first of the one or more further parts of the volume of waste may be the further part next to the first part. Preferably the further parts are monitored in sequence, preferably progressing from the first part towards the further part of the volume furthest therefrom.

According to a third aspect of the present invention we provide apparatus for monitoring a volume of waste for radioactive material, the apparatus comprising:

the support, the support being provided with a plurality of detectors for radioactive material;

the detectors being provided with a collimator to define a first field of view;

the detectors being provided with a further collimator to define a second field of view which, in at least one configuration of the further collimator, is a part of the first field of view, the further collimator being adjustable to provide different configurations thereof and the second field of view including at least a part of a monitoring space for the volume of waste.

According to a fourth aspect of the present invention we provide a method of monitoring a volume of waste for radioactive material, the method comprising:

providing a volume of waste in a monitoring space;

providing a support, the support being provided with a plurality of detectors for radioactive material, the detectors being provided with a collimator to define a first field of view, the detectors being provided with a further collimator to define a second field of view which, in at least one configuration of the further collimator, is a part of the first field of view, the further collimator being adjustable to provide different configurations thereof;

monitoring the volume of waste for radioactive material in the second field of view.

The third and/or fourth aspects of the present invention may include any of the features, options or possibilities set out elsewhere in this document, including in particular from amongst the following.

The support may extend around at least three sides of the monitoring space. The support may be moveable relative to the monitoring space.

The detectors may be identical to one another. The detectors are preferably gamma detectors. The detectors may include NaI crystals. The collimators may define a conical field of view as the first field of view.

One or more of the further collimators may be formed of a plurality of elements. One or more of the further collimators may comprise a first plate and a second plate. Preferably the plates are planar, most preferably the plane is perpendicular to the axis of the first field of view and/or the second field of view. The elements may have opposing edges. Preferably the edges are parallel to one another. Preferably the elements are slidably mounted, potentially directly or indirectly on the support.

The second field of view may be a sectioned cone. The cross-section of the second field of view, preferably perpendicular to the axis thereof, may be defined by a pair of opposing parallel edges linked by opposing parts of a circle. Preferably the parallel edges are defined by the further collimator. Preferably the part circles correspond to part of the first field of view. The second field of view may remove a section from the first field of view, preferably an equivalent section from each side.

Preferably the different configurations of the second field of view are provided by varying the separation of a plurality of elements, particularly the separation between two plates. The separation of the elements may be varied along an axis. The axis may be parallel to the axis of the relative movement of the support and the monitoring space.

The configuration of the second field of view is preferably the same during the monitoring of a volume of waste. The configuration of the second field of view may be varied between the monitoring of one volume of waste and the monitoring of a different volume of waste. The configuration may be varied where the size of the volume of waste varies between monitorings. The configuration may be varied where the waste type varies between one monitoring and a further monitoring.

The plurality of detectors may be provided with equivalent first fields of view. The plurality of detectors may be provided with equivalent second fields of view. Preferably the second fields of view overlap between adjacent detectors. Preferably the detectors along the top and/or bottom have second fields of view which overlap perpendicular to the direction of relative movement between the support and monitoring space. Preferably the parallel edges of the second fields of view for adjacent detectors are aligned with one another, ideally this applies to detectors on the top and/or bottom and/or one or both sides.

Preferably the second fields of view include a segment of the monitoring space and/or the volume of waste. The segment may be wedge shaped. The volume of waste may be monitored using four or more segments and preferably using ten to twenty segments.

The second field of view may be narrower parallel to the direction of relative movement than perpendicular to the direction of relative movement. The second field of view may be a parallel sided slice. The second field of view may be non-parallel sided slice, such as a wedge.

According to a fifth aspect of the present invention we provide apparatus for monitoring a volume of waste for radioactive material, the apparatus comprising:
- a support, the support being provided with a plurality of detectors for radioactive material;
- a monitoring space in which the volume of waste is provided;
- a data processor for calculating a monitoring result, for correcting the monitoring result for geometry and/or attenuation to give a corrected result and for providing a correction factor for correcting the monitoring result to give the corrected result;
  - wherein the correction factor is obtained by a method comprising:
    - providing an equivalent volume of waste free of radioactive material in an equivalent monitoring space, with an equivalent support provided with equivalent detectors;
    - dividing in one or more parts, the volume of waste into a plurality of equal volumes;
    - providing a known activity radioactive source at one or more positions in one or more of the equal volumes;
    - monitoring the detector response to the source in a position in one of the equal volumes, a comparison of the response and known activity contributing to a correction function for that equal volume, one or more such correction functions providing the correction factor.

According to a sixth aspect of the present invention we provide a method of monitoring a volume of waste for radioactive material, the method comprising
- providing the volume of waste in a monitoring space;
- providing a support, the support being provided with a plurality of detectors for radioactive material;
- monitoring the volume of waste for radioactive material, in one or more parts, to give a monitoring result;
- correcting the monitoring result for geometry and/or attenuation to give a corrected result using a correction factor;
  - wherein the correction factor is obtained by a method comprising:
    - providing an equivalent volume of waste free of radioactive material in an equivalent monitoring space, with an equivalent support provided with equivalent detectors;
    - dividing in one or more parts, the volume of waste into a plurality of equal volumes;
    - providing a known activity radioactive source at one or more positions in one or more of the equal volumes;
    - monitoring the detector response to the source in a position in one of the equal volumes, a comparison of the response and known activity contributing to a correction function for that equal volume, one or more such correction functions providing the correction factor.

The fifth and/or sixth aspects of the present invention may include any of the features, options or possibilities set out elsewhere in this document, including in particular from amongst the following.

The volume of waste may be monitored in one or more parts, with the monitoring performed on the parts being combined to give the monitoring result. The one or more parts may be segments. The volume may be monitored using four or more parts and preferably using ten to twenty parts. The monitoring of each part may be corrected for geometry and/or attenuation separately, with the corrected monitorings being combined to give the corrected result. The monitoring for each part may be combined and then corrected for geometry and/or attenuation to give the corrected result.

The equivalent volume of waste is preferably equivalent in terms of the volume of waste and/or the type of waste and/or the material forming the waste and/or the density of the waste and/or the container holding the waste and/or attenuation properties. The equivalent monitoring space is preferably equivalent in terms of the size and/or shape and/or volume and/or position of the support relative to the monitoring space. Preferably the equivalent support is equivalent in terms of its shape and/or configuration and/or size and/or position relative to the monitoring space. Preferably the equivalent detectors are equivalent in terms of the detector type and/or the number of detectors and/or the detector position and/or the collimator and/or the further collimator and/or the configuration of the further collimator.

The volume of equivalent waste may be monitored in one or more parts, preferably equivalent to the one or more parts of the waste. The one or more parts of the equivalent waste may be segments. The volume of equivalent waste may be monitored using four or more parts and preferably using ten to twenty parts.

The shape of the equal volumes may be different from one another. The shape of the equal volumes may be different for different detector positions and/or detector configurations. The shape of the equal volumes may be different for different numbers of detectors.

The shape of the equal volumes may be defined relative to the location separated from all of the detectors by the greatest distance, particularly the greatest distance through the waste and/or container therefor. The equal volume containing that location may be the core equal volume. The core equal volume may be defined in terms of the volume bounded by a given minimum distance from all the detectors and/or a given distance from that location and/or a shape centred on that location. The core equal volume may be that volume to which the detectors are least sensitive. The other equal volumes may be defined in layers around the core equal volume. The other equal volumes may be defined as that volume which is all between a first given minimum distance and a second given minimum distance from all the detectors, the first and second distances varying for the different equal volumes.

The method may be repeated with a number of different known activity sources. Preferably the method is performed using a Cs137 source and/or a Co60.

The positions may be evenly distributed throughout an equal volume. Preferably positions are provided evenly distributed throughout all the volumes. Between 5 and 20 positions may be provided for each equal volume and/or each segment.

One or more of the positions may be at locations equidistant from the boundary of the equal volume with the next equal volume out and the boundary of the equal volume with the next equal volume in. One or more of the positions may be at locations equidistant from the boundary of the equal volume with the next equal volume out and the location with the greatest minimum distance from all detectors. One or more of the positions may be at locations equidistant from the boundary of the equal volume with the next equal volume in and the outside boundary of the equal volume. One of the positions may be at the location with the greatest minimum distance between it and all the detectors. The positions may be representative of different positions within an equal volume.

The positions may be accessed using one or more tubes provided in the waste. A tube may provide access to one or more of the positions. A tube may provide access to one or more of the equal volumes. The tubes may be filled with waste apart from at the positions occupied by the source or sources. The tubes are preferably provided with an open end. A closure for the open end may be provided. The open end may be provided at the top and/or one or more sides and/or bottom of the waste and/or container.

Preferably all equal volumes are considered using a source. Preferably a plurality, ideally all, of the positions within an equal volume are provided with sources whilst the detector response is monitored. Preferably a plurality, ideally all, of the same position equal volumes in the segments are provided with sources whilst the detector response is monitored. Preferably the approach is repeated separately for each of the equal volumes. The response of one or more, preferably all, of the detectors may be monitored. Preferably the approach is repeated for a plurality of different sources.

The detector response for each detector may be considered separately and/or with the other detectors.

The comparison may be of the calculated or monitored response without the waste present compared with the waste present.

The correction function may relate to the sensitivity of one or more, preferably all, the detectors to activity in the equal volume involved.

The correction factor may be a combination of all the correction functions. A single correction factor for each part or segment may be provided. A single correction factor for the volume may be provided. Different correction factors may be used for different parts and/or segments of the volume.

Preferably the radioactive material in the waste is assumed to be homogeneously distributed therein. Preferably the waste is assumed to be homogeneous in nature.

The sensitivity determined for one or more equal volumes may be too low to be detected or statistically significantly detected in the monitoring time period used. Where such a sensitivity is deemed to apply, the monitored result may be deemed to have detected no emissions from that equal volume or volumes. The monitored result, more preferably the corrected result, may be deemed to be the emissions from the other equal volumes only. The monitored result, more preferably the corrected result, may be increased proportionately to the proportion that the equal volumes deemed to be undetected represent of the total volume.

According to a seventh aspect of the present invention we provide apparatus for monitoring a volume of waste for radioactive material, the apparatus comprising a support, the support being provided with a plurality of detectors for radioactive material;

a monitoring space in which the volume of waste is provided;

a data processor for calculating a monitoring result, for correcting the monitoring result for geometry and/or attenuation to give a corrected result and for providing a correction factor for correcting the monitoring result to give the corrected result;

wherein the correction factor is obtained by a method comprising:

providing a simulation of an equivalent volume of waste free of radioactive material in an equivalent monitoring space, with equivalent detectors;

providing a known activity radioactive source at one or more positions in the volume of waste;

determining the detector response to the source in a position, a comparison of the response and known activity contributing to a correction function for that equal volume, one or more such correction functions providing the correction factor.

According to an eighth aspect of the present invention we provide a method of monitoring a volume of waste for radioactive material, the method comprising providing the volume of waste in a monitoring space;

providing a support, the support being provided with a plurality of detectors for radioactive material;

monitoring the volume of waste for radioactive material, in one or more parts, to give a monitoring result;

correcting the monitoring result for geometry and/or attenuation to give a corrected result using a correction factor;

wherein the correction factor is obtained by a method comprising:

providing a simulation of an equivalent volume of waste free of radioactive material in an equivalent monitoring space, with equivalent detectors;

providing a known activity radioactive source at one or more positions in the volume of waste;

determining the detector response to the source in a position, a comparison of the response and known activity contributing to a correction function for that equal volume, one or more such correction functions providing the correction factor.

The seventh and/or eighth aspects of the present invention may include any of the features, options or possibilities set out elsewhere in this document, including in particular from amongst the following.

Preferably the simulation is a computer simulation.

The simulation may account for one or more of: detector type, detector sensitivity, detector positions relative to each other, detector positions relative to the monitoring space, field of view positions and shape, container shape, container material, container position within the monitoring space, waste shape, waste material, waste position within the monitoring space.

The simulation may be performed using the Monte Carlo Neutrons and Photons modelling package/

The simulation may account for the factors involved in the detection of emissions due to issues of geometry and/or due to issues of attenuation and/or due to issues of detector and/or apparatus performance.

Preferably the simulation includes introducing one or more simulated sources to one or more positions within the waste and consider the detector responses thereto. Preferably sensitivity values are derived from the detector response. The positions used in the simulation could be homogeneously dispersed sources throughout the waste.

A simulation may be verified using the apparatus and/or method of the fifth and/or sixth aspects of the invention.

The simulation may be a physical simulation. The simulation may include the provision of an equivalent support and/or equivalent detector positions. The simulation may include dividing, in one or more parts, the volume of waste into a plurality of equal volumes. The known activity radioactive source may be a simulated source. Preferably the simulation includes the simulation of the source at one or more positions in one or more of the equal volumes. The detector response may be determined by monitoring, particularly for a physical simulation. The detector response may be calculated as part of the simulation, particularly for a computer simulation.

According to a ninth aspect of the present invention we provide apparatus for monitoring a volume of waste for radioactive material, the apparatus comprising
 a support, the support being provided with a plurality of first detectors for radioactive material;
 the first detectors being provided with one or more collimators to define their fields of view, the fields of view including at least a part of a volume of waste;
 a further detector provided with one or more collimators to define a further detector field of view, the further detector field of view including within it that location in the at least a part of the volume of waste which has the greatest minimum distance from all the first detectors.

According to a tenth aspect of the present invention we provide a method of monitoring a volume of waste for radioactive material, the method comprising
 providing a volume of waste in a monitoring space;
 providing a support, the support being provided with a plurality of first detectors for radioactive material, the detectors being provided with one or more collimators to define their field of view, their fields of view including at least a part of the volume of waste;
 providing a further detector provided with one or more collimators to define a further detector field of view, the further detector field of view including within it that location in the at least a part of the volume of waste which has the greatest minimum distance from all the first detectors;
 monitoring the volume of waste for radioactive material.

The ninth and/or tenth aspects of the present invention may include any of the features, options or possibilities set out elsewhere in this document, including in particular from amongst the following.

The first detectors are preferably the detectors of elsewhere in this document.

The at least a part of the volume of waste with the fields of view of the first detectors may be a segment.

The further detector may be of the same type as the first detectors. The further detector may be more sensitive than the first detectors. Preferably the further detector is provided with a different collimator or collimators to the first detectors. The field of view of the further detector may be more restricted. One or more further detectors may be provided.

The further detector or detectors field of view preferably includes within it that part of the volume of waste which is furthest from the first detectors. The further detector or further detectors field of view preferably includes within it that equal volume which contains the waste furthest from the first detectors.

According to a eleventh aspect of the present invention we provide apparatus for monitoring a volume of waste for radioactive material, the apparatus comprising
 a monitoring space;
 a support, the support being provided with a plurality of detectors for radioactive material;
 a data processor, the data processor calculating a monitored result which includes information on one or more directly detected isotopes, the data processor calculating a calculated result from the monitored result, the calculated result including information on one or more not directly detected isotopes, the data processor selecting a function for use in the calculation of the calculated result, the function being selected from a memory and being selected according to one or more characteristics of the monitored result.

According to a twelfth aspect of the present invention we provide a method of monitoring a volume of waste for radioactive material, the method comprising
 providing a volume of waste in a monitoring space;
 providing a support, the support being provided with a plurality of detectors for radioactive material;
 monitoring the volume of waste for radioactive material to obtain a monitored result which includes information on one or more directly detected isotopes;
 calculating a calculated result from the monitored result, the calculated result including information on one or more not directly detected isotopes, the calculation of the calculated result using a function, the function being selected according to one or more characteristics of the monitored result.

The eleventh and/or twelfth aspects of the present invention may include any of the features, options or possibilities set out elsewhere in this document, including in particular from amongst the following.

The monitored result may be the count and/or count rate and/or activity detected by the detectors. The monitored result may be uncorrected. The monitored result may be corrected for attenuation and/or geometry.

The information on the one or more directly detected isotopes may include their count and/or count rate and/or activity. The information may include the ratio of information for two or more energies. The two or more energies may be energies of the same isotope, but are preferably energies of different isotopes. The information may include a ratio involving Cs137 and Co60, such as the ratio between the count and/or count rate and/or activity at one energy for one of the isotopes to the count and/or count rate and/or activity at another energy for the other of the isotopes.

The calculated result may be the count and/or count rate and/or activity for all radioactive material in the volume of waste or a part thereof. The calculated result preferably accounts for isotopes which can be monitored directly and those which cannot.

The function may be one or more ratios. The ratio may be the ratio of the count and/or count rate and/or activity for a directly detected isotope to another isotope. The another isotope may be directly detectable or not. The function may be a set of ratios. Preferably the function relates all of the not directly detectable isotopes to one or more directly detected isotopes. The function may be a fingerprint, preferably a fingerprint for a waste type. Two or more functions may be provided, each preferably containing one or more ratios, preferably with one or more different ratios. The ratios may differ it terms of the isotopes they relate to one another, or more preferably in terms of the difference in the ratio of a detected to an not detected isotope they detail. The function may be related to a waste type. The function may be related to a source of waste. The function may be related to the nature of the environment the waste was exposed to. The function may be different for neutron activation waste to fission product and/or fuel pin leakage waste.

The characteristic the function is selected on may be based upon the ratio of one isotope in the monitored result to another and/or upon the ratio of the count and/or count rate and/or activity at one energy in the monitored result to another and/or upon the level of one or more isotopes and/or energies in the monitored result. The function may particularly be selected based upon the ratio of counts and/or count rate and/or activity indicative of Cs137 to Co60 or vice versa.

It is particularly preferred that the volume of waste be considered in a plurality of parts. Preferably the method is applied individually to each part. Thus one function may be used for one part, with another function being used for the adjoining part and so on.

The plurality of parts may be a plurality of segments. A segment may be that part of the waste within the fields of view of the detectors at a first position for the support and/or at a given configuration for the collimators of the detectors. A segment may be subdivided with the method being applied to each resulting sub-part.

A part may extend for the full depth and width of a volume of waste, but less than its full length. A part may extend for a fraction of the full depth and/or width of a volume of waste and less than its full length. A part may be a fraction of slice through the volume of waste, for instance a quarter of a slice.

A part may be a small fraction of the volume of waste, for instance equal to or less than 0.1% thereof, preferably equal to or less than 0.01% thereof. The method may be applied independently with respect to each of these parts. The monitored results from each of the detectors may be considered independently in such an approach. The monitored results may be subjected to deconvolution and/or tomography to provide the monitored result for each part.

The results of the application of the methods to the parts may be combined, preferably summed, to give an overall result.

According to a thirteenth aspect of the present invention we provide apparatus for monitoring a volume of waste for radioactive material, the apparatus comprising
  a monitoring space;
  a support, the support being provided with a plurality of detectors for radioactive material;
  a data processor, the data processor calculating a monitored result, determining the level of radioactive material in one or more parts of the volume of waste and comparing the level of radioactive material in one of the parts with the level of radioactive material in another part.

According to a fourteenth aspect of the present invention we provide a method for monitoring a volume of waste for radioactive material, the method comprising
  providing a volume of waste in a monitoring space;
  providing a support, the support being provided with a plurality of detectors for radioactive material;
  monitoring the volume of waste for radioactive material to obtain a monitored result; determining the level of radioactive material in one or more parts of the volume of waste;
  comparing the level of radioactive material in one of the parts with the level of radioactive material in another part.

The thirteenth and/or fourteenth aspects of the present invention may include any of the features, options or possibilities set out elsewhere in this document, including in particular from amongst the following.

The monitored result and/or level of radioactive material may be the count and/or count rate and/or activity. The monitored result and/or level of radioactive material may be uncorrected. The monitored result and/or level of radioactive material may be corrected for attenuation and/or geometry.

It is particularly preferred that the volume of waste be considered in more than two parts. Preferably the method is applied individually to a plurality of pairs of parts.

The parts may be a segments. A segment may be that part of the waste within the fields of view of the detectors at a first position for the support and/or at a given configuration for the collimators of the detectors. A segment may be subdivided with the method being applied to each resulting sub-part as the part.

A part may extend for the full depth and width of a volume of waste, but less than its full length. A part may extend for a fraction of the full depth and/or width of a volume of waste and less than its full length. A part may be a fraction of slice through the volume of waste, for instance a quarter of a slice.

A part may be a small fraction of the volume of waste, for instance equal to or less than 0.1% thereof, preferably equal to or less than 0.01% thereof. The method may be applied with respect to each of these parts. The monitored results from each of the detectors may be considered independently in such an approach. The monitored results may be subjected to deconvolution and/or tomography to provide the monitored result for each part.

The method and/or apparatus may be used to establish whether there is non-uniformity of activity distribution in the volume of waste.

Preferably the activity for a part is established using the detectors which monitor that part.

Preferably differences in the activity between parts are used as an indicator of non-uniform activity being present. The apparatus and/or method may provide an indication as to the actual activity involved and/or an indication as to the location thereof.

The apparatus and/or method may involve a set of views of the waste to be taken, preferably from a variety of directions. This may include that being repeated at a variety of different positions relative to the waste, for instance along the waste. Imaging of the activity and its position may be provided.

The method and/or apparatus may involve recording the output from each detector at each measurement segment separately and perform a deconvolution thereon. Tomography may be used on the data set, for instance to give a voxelated image of the activity distribution. The volume in the container would be broken down into a thousands or more parts or voxels. The activity associated with each part or voxel may be obtained. The differences in the activity of one part or voxel compared with one or more of the others can be established. A range of activities may be defined, with activities falling within that range being accepted as evenly distributed activity and/or with activities outside that range being deemed non-uniform activity distribution. The actual level of activity for a part or voxel and/or the position of that part or voxel can be provided.

According to a fifteenth aspect of the present invention we provide apparatus for monitoring a volume of waste for radioactive material, the apparatus comprising
  a monitoring space;
  a support, the support being provided with a plurality of first detectors for radioactive material;
  a radioactive transmission source;

a transmission detector for transmissions which have interacted with the volume of waste;

a data processor for comparing one or more attenuation characteristics of the volume of waste according to the transmission detector with one or more attenuation characteristics used in the monitoring.

According to a sixteenth aspect of the present invention we provide a method of monitoring a volume of waste for radioactive material, the method comprising providing a volume of waste in a monitoring space;

providing a support, the support being provided with a plurality of first detectors for radioactive material;

monitoring at least a part of the volume of waste for radioactive material;

providing a radioactive transmission source;

providing a transmission detector for transmissions which have interacted with the volume of waste;

comparing one or more attenuation characteristics of the volume of waste according to the transmission detector with one or more attenuation characteristics used in the monitoring.

The fifteenth and/or sixteenth aspects of the present invention may include any of the features, options or possibilities set out elsewhere in this document, including in particular from amongst the following.

The transmission source is preferably provided on an opposing side of the volume of waste to the transmission detector. The transmission source may be below the volume of waste, above or to a side thereof. One or more transmission sources may be provided.

The transmission detector may be of the same or a different type to the first detectors. The transmission detector may be provided with a different collimator and/or field of view to the first detectors. One or more detectors for transmissions may be provided.

Preferably the emissions have interacted with the volume of waste by passing through from one side to another. The emissions may have interacted by entering and returning from the volume of waste, either themselves or in terms of a form of emission they cause.

Preferably the emissions interact with, ideally pass through, that part of the volume of waste which is furthest from the first detectors. Preferably the field of view of the transmission detector includes that part of the volume of waste which is furthest from the first detectors. The emissions may interact with, ideally pass through, that equal volume which contains the waste furthest from the first detectors. The field of view of the transmission detector preferably includes that equal volume which contains the waste furthest from the first detectors.

Transmissions may be passed through a plurality of, and preferably all, parts of the volume of waste to reach one or more transmission detectors. Different paths for the transmission emissions through the volume may be provided by one or more of the following: moving the transmission source and the detector it is paired with to a variety of positions; moving the transmission source so that it is "aimed" at a detector along a different path; moving the transmission source to a different position, with the source pairing with a different detector already in position; using multiple transmission sources paired with multiple detectors.

Preferably the volume of waste is exposed to the transmission source at a different time to the monitoring. The transmission detector may be one of the first detectors.

The one or more attenuation characteristics of the volume of waste according to the transmission detector may be the extent of attenuation, for instance along a particular path, and/or the variation in attenuation along one path compared with another and/or the variation in attenuation compared with a preset value, such as that used in the assumptions for the monitoring.

The one or more attenuation characteristics maybe determined by considering the change in energy caused by the volume of waste on two or more energies emitted by the transmission source. Two or more of the energies may arise from the same isotope of the transmission source. Two or more of the energies may arise from a different isotope of the transmission source, for instance one from Co and one from Cs, for instance Cs at 662 keV and/or Co 1331 keV.

The one or more attenuation characteristics used in the monitoring may include the characteristic that attenuation is homogeneous throughout the volume of waste and/or that the waste is homogeneous.

The comparison may establish that the approach taken to attenuation in the monitoring was appropriate. The comparison may establish that the approach taken to attenuation in the monitoring was inappropriate.

The results of the transmission detector and/or the comparison may be made available to the apparatus and/or method operator. The results of the transmission detector and/or the comparison may only be made available to one or more third parties, for instance verification parties or the disposal facility party.

The one or more attenuation characteristics of the volume of waste according to the transmission detector from one volume of waste may be further compared with those from one or more further volumes of waste. The further comparison may reveal attenuation characteristics for waste volumes over time and/or variations between the attenuation characteristics for waste and the assumed characteristics.

The results of the further comparison may be made available to the apparatus and/or method operator. The results of the transmission detector and/or the comparison may only be made available to one or more third parties, for instance verification parties or the disposal facility party.

According to a seventeenth aspect of the invention we provide apparatus for monitoring a volume of waste for radioactive material, the apparatus comprising a monitoring space;

a support, the support being provided with a plurality of first detectors for radioactive material;

a data processor, the data processor determining the ratio of the level of emissions at two different energies with predetermined ratio information, the comparison providing information on the attenuation properties of the volume of waste.

According to an eighteenth aspect of the invention we provide a method for monitoring a volume of waste for radioactive material, the method comprising providing a volume of waste in a monitoring space;

providing a support, the support being provided with a plurality of first detectors for radioactive material;

monitoring at least a part of the volume of waste for radioactive material;

monitoring at least two different energies of emissions from the waste;

comparing the ratio of the level of emissions at the two different energies with predetermined ratio information, the comparison providing information on the attenuation properties of the volume of waste.

The seventeenth and/or eighteenth aspects of the present invention may include any of the features, options or possibilities set out elsewhere in this document, including in particular from amongst the following.

The predetermined information may be obtained from reference materials and/or calculations and/or the consideration of unattenuated sources to establish the ratio of the activity of the lower energy to the higher energy of the pair. The predetermined information may relate to the materials and/or densities and/or geometry expected to apply to the volume of waste.

A decrease in the level of the lower energy relative to the higher energy is preferably representative of higher attenuation.

Preferably the comparison establishes whether the attenuation is at the expected level and/or within the expected range and/or at the level used in the assumptions for the calculations and/or within the range used in the assumptions for the calculations. The comparison may suggest that the attenuation is higher than expected and/or is higher than is possible for accurate monitoring. The comparison may result in the expression of a measure of the level of attenuation. The comparison may provide a further correction factor for this attenuation.

The approach preferably uses a pair of energies from the same isotope. More than two energies can be considered.

It is possible to combine this method with the type of transmission based investigation detailed in the aspects provided above, for instance to provide information on the position of the increased attenuation and/or to provide a still further correction factor which accounts for the extent and position of the increased attenuation.

BRIEF DESCRIPTION OF THE DRAWINGS

Various embodiments of the invention will now be described, by way of example only, and with reference to the accompanying drawings in which:—

DETAILED DESCRIPTION OF THE PREFERRED EMBODIMENTS

Figure 1:
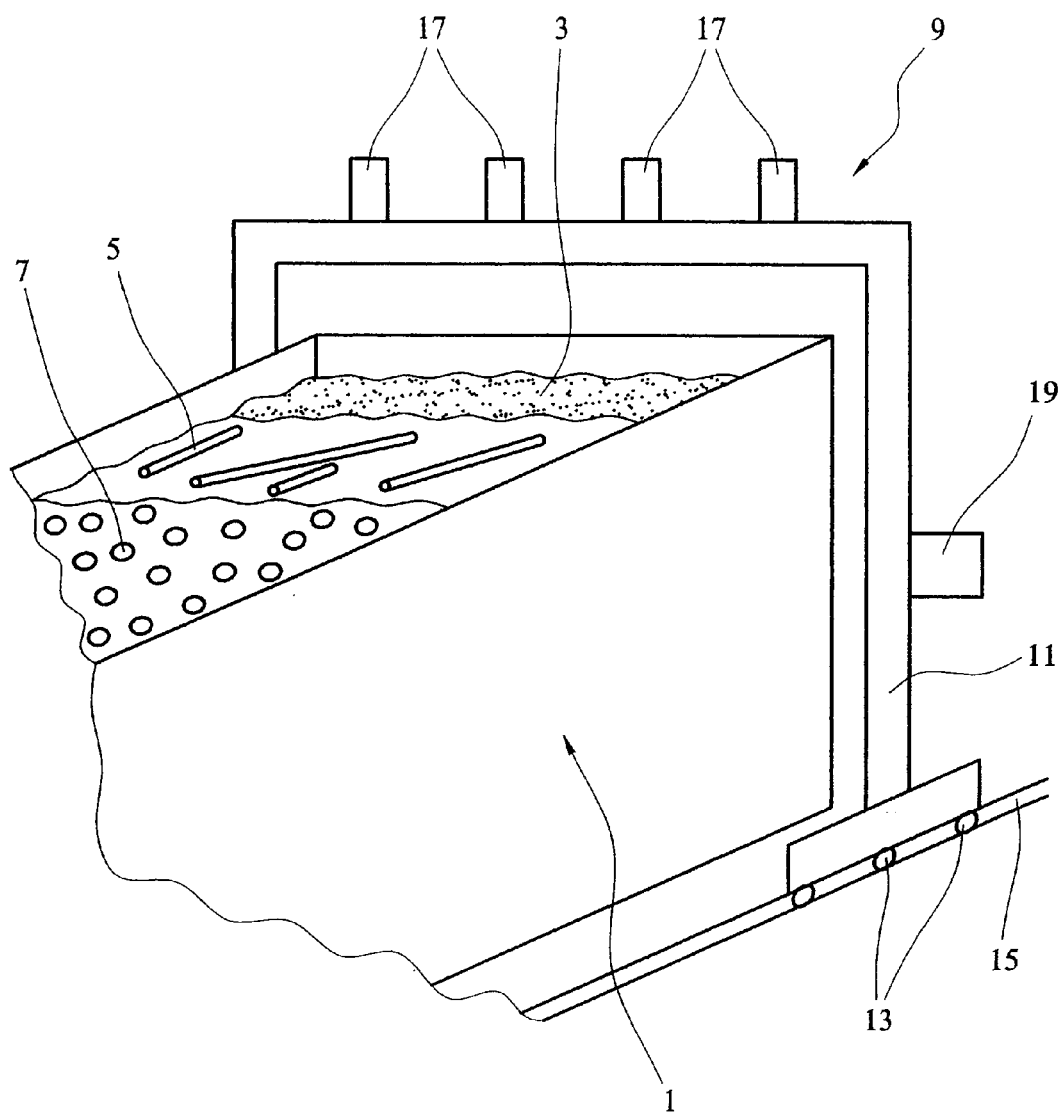
FIG. 1 is a perspective view showing an instrument according to one embodiment of the present invention.

During the operation and decommissioning of nuclear power stations and other plant involved in the nuclear fuel cycle low level waste, LLW, in particular is generated. LLW is that waste having a level of contamination with radioactive material above the level where it can be released for disposal in civil waste sites and below that where it is classified intermediate level waste and so different approaches need to be taken to its storage. LLW is usually sent to medium to long term disposal facilities. The facilities for LLW, are usually limited in terms of the total volume of material they can accommodate and the total amount of radioactive material they can accommodate. Uncompactable LLW is a particularly high consumer of available volume as its volume cannot be significantly reduced for storage. Such wastes include steel, soil, concrete, pipes and the like. Uncompactable waste is normally defined as that which in a High Force compactor cannot be reduced in volume by more than 30% compared with the initial volume.

The more accurate the measurement of radioactivity that can be made, the greater the extent to which the facility's total amount of radioactivity can be used up. Less accurate measurements result in a greater margin of error having to be provided for and this may result in the facility's total amount of radioactivity being used up by phantom activity. This leads to underutilisation of the disposal facility, shortens the life thereof and hastens the date at which a new facility needs to be made available. The licensing, in particular, of a new facility is a massive, time consuming and expensive undertaking.

Efforts to measure LLW using NDA have to date concentrated on compactable LLW. These approaches are not suitable for uncompactable LLW for a number of reasons. Approaches for uncompactable LLW which have been accepted to date, involve the use swabs to sample activity and/or health physics dose rate probes or contamination probes to measure activity. These approaches are problematic from an accuracy point of view, are not suited to considering the waste in bulk and require highly trained health physics staff who are in demand and hence have a high associated cost.

As well as these issues, such waste is often filled into ISO FREIGHT containers and half height ISO FREIGHT containers which are then transported and stored at the LLW disposal facilities. Such containers are of a very substantial size and contain a substantial thickness of material, impacting further on the accuracy and ease with which measurements can be made.

Techniques which use a single detector have been established to face problems in terms of significant unevenness of response when measuring large containers. A simple detector placed alongside the container produces an inaccurate measurement due to: the wide range of distances between any sources and the detector; the wide range of absorbers between any sources and the detector; the non uniform spatial response of the detector.

To address such issues, according to the present invention, and referring to FIG. 1, a half ISO container 1 is shown positioned for investigation. A half ISO container 1 is around 6 m long, 2.6 m wide and 1.3 m high. Loaded with uncompactable material they contain around 16 to 22 tonnes of waste.

The container 1 is seemingly loaded with soil 3 in one part, poles 5 in another and limestone chippings 7 in another. The container 1 is straddled by a gantry 9. The legs 11 of the gantry 9 have wheel sets 13 which cooperate with rails 15 on either side of the container 1. The gantry 9 can be moved from a first measurement position, as shown, to a second measurement position closer to the viewer, then a further still closer to the viewer and so on. The gantry is static during measurement.

The gantry 9 accommodates four gamma detectors 17 evenly spaced across the top of the container 1. A single gamma detector 19 is provided on each of the legs 11 of the gantry 9. The detectors 17, 19 are generally low resolution gamma detectors. Such apparatus allows effective measurement of such containers for the first time, as the non uniformity of response is greatly reduced with an array of detectors. Furthermore, this is achieved with realistic operating times and with greatly reduced dose to the operators when compared with the previous health physic based approaches. The movement of the gantry past the container, or in an alternative form, the movement of the container past the gantry, means that the prohibitively expensive provision of detectors to cover the whole container at once is avoided.

In a particularly preferred embodiment an array of gamma detectors are provided above the container 1 and an array of gamma detectors are provided below the container 1. Optional side detectors may also be provided.

Figure 2:
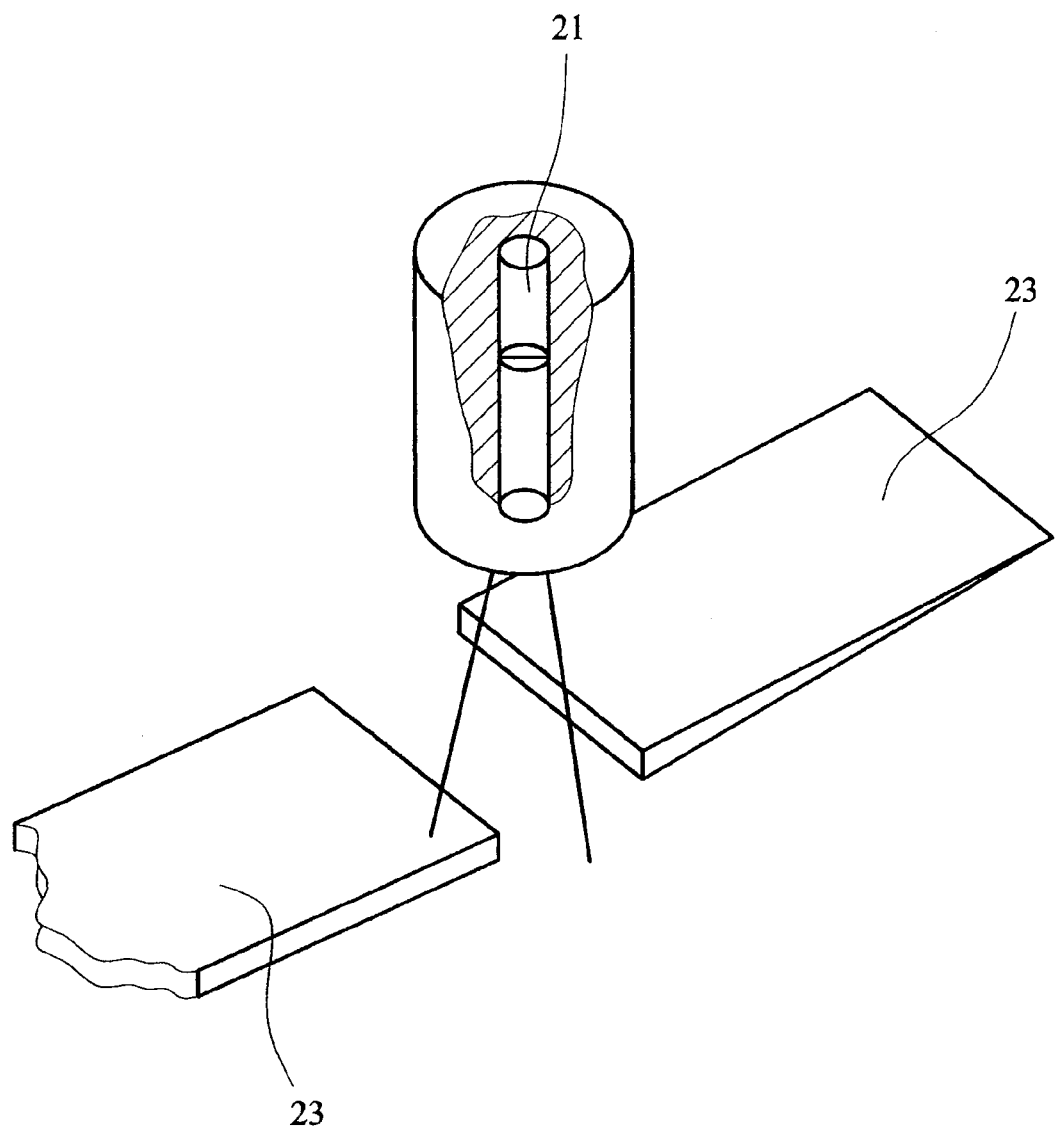
FIG. 2 is a perspective view of the detector gantry of the instrument of FIG. 1.
Figure 3:
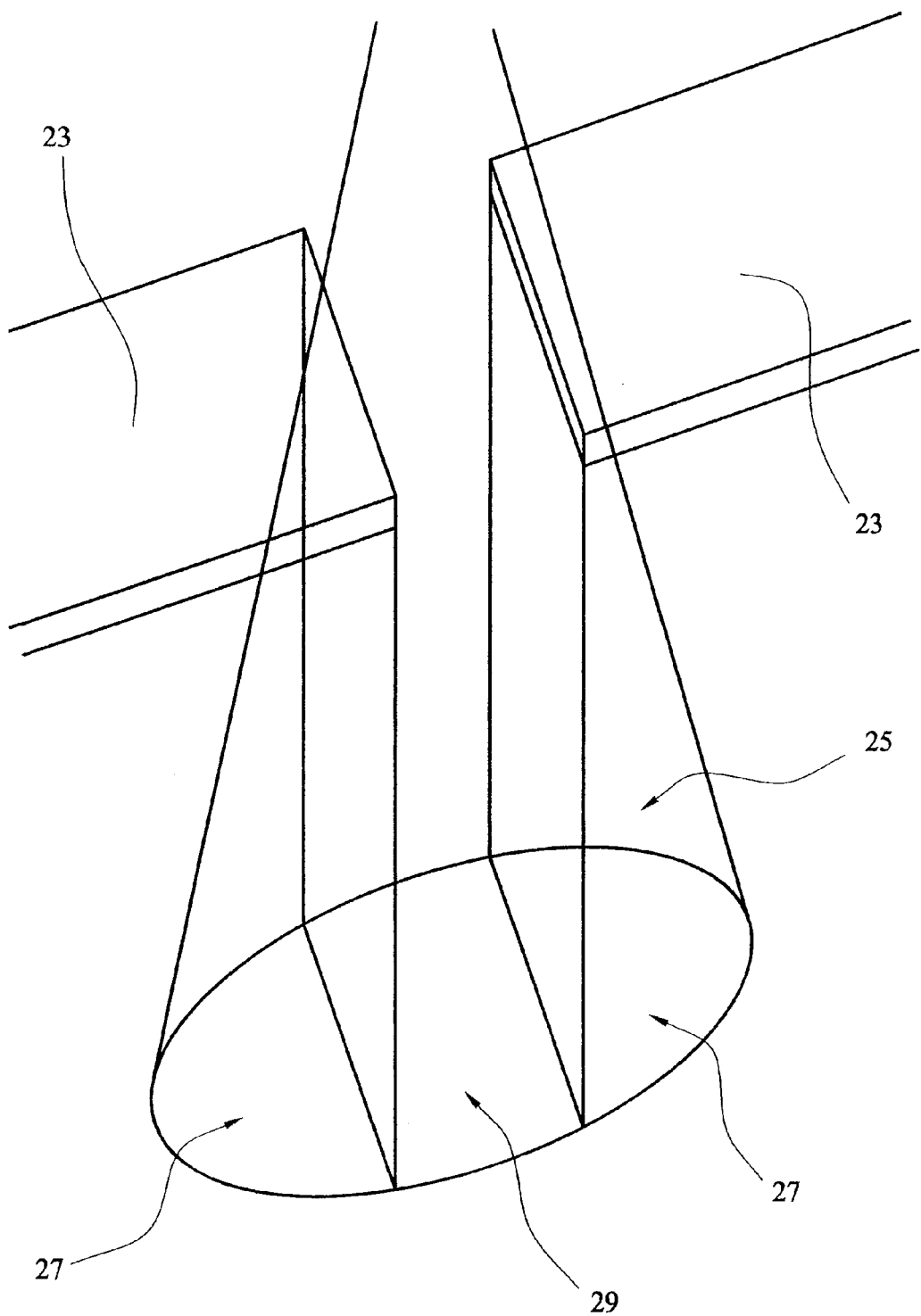
FIG. 3 is a schematic illustration of the fields of view of one of the detectors.
Figure 4:
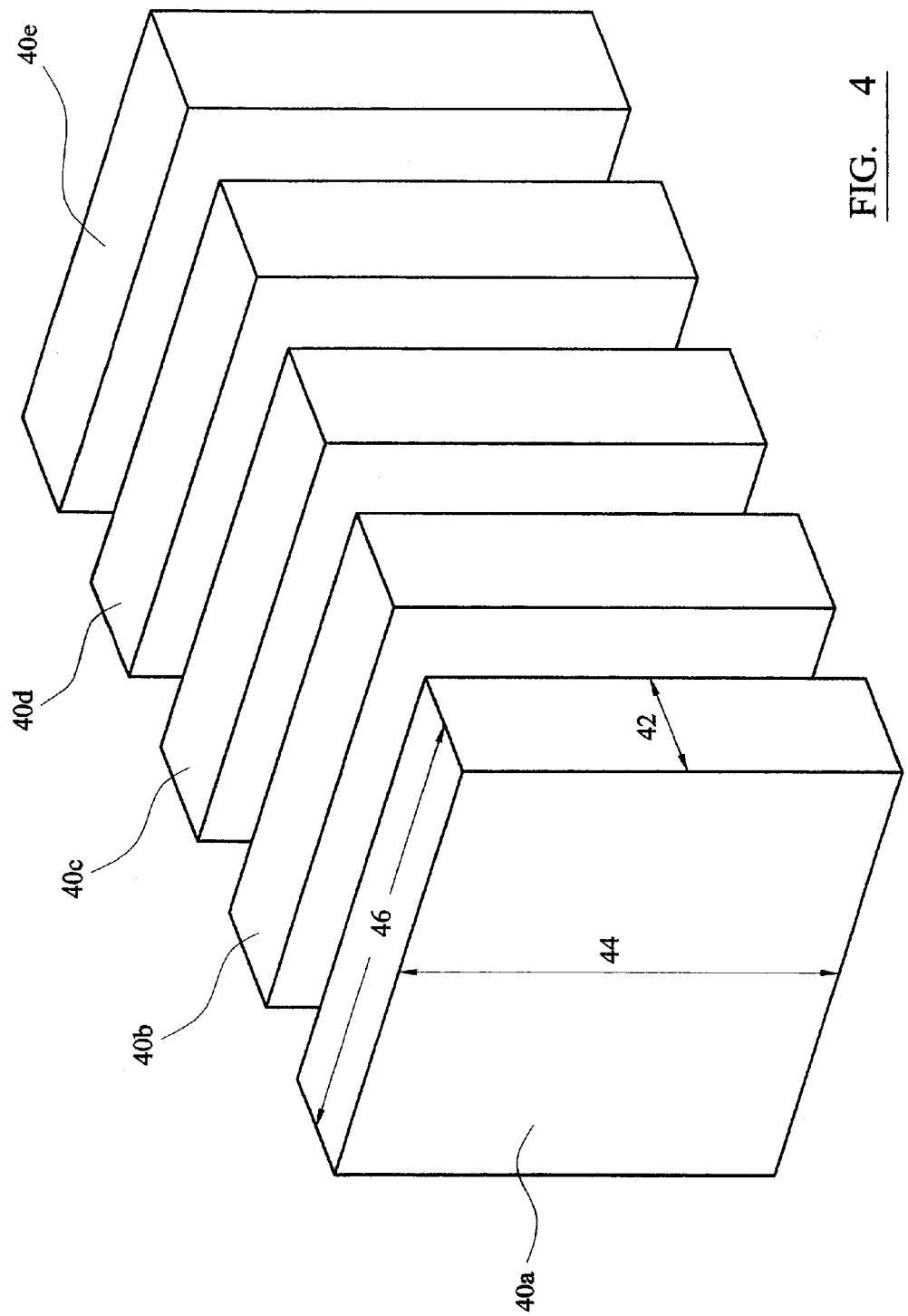
FIG. 4 schematically illustrates the segmented approach taken in the present invention.

As more clearly seen in FIG. 2, the detectors 17, 19 each include a detector crystal (usually NaI), a collimator 21 which define a first conical field of view and shutters 23 which are slidably mounted and can be used to reduce the first field of view down to a second field of view. As shown in FIG. 3, the first conical field of view 25 is truncated at its sides 27 by the shutters 23 to give the second field of view 29. The second fields of view 29 of this type, when combined for the various detectors represent one approach to considering the container 1 and waste it contains in a series of parts or segments 40 of the type shown in FIG. 4.

Benefits in considering the container 1 using such a collimator design are obtained. The field of view can be controlled as desired and hence the segment dimensions and shape can be controlled. This in turn allows flexibility on the size and shape of container being monitored.

A generally slice like segment is useful for the further analysis of the contents of the container as described later. A segment 40 is in effect considered for each measurement position, which in the case illustrated in FIG. 4 means the container is considered by means of five segments 40a, 40b, 40c, 40d, 40e. In practice ten to twenty segments would normally be used, but the thickness would vary when considering containers of different depths and/or when different waste types are being considered. All the segments 40 used to consider a particular container 1 have the same thickness 42 measured in the direction of travel of the gantry between measurement positions. The same depths 44 and widths 46 are present because of the bounds of the container 1. To present the different segments 40 to the detectors 17, 19 the investigation method includes moving the gantry 9 to the first measurement position and then on to a second measurement position and so on. The process is repeated for the other segments 40 over the course of the investigation run. A time period of around 6 hours enables an ISO FREIGHT container 1 to be considered.

The measured amounts of activity for the measured isotopes in a segment 40 is corrected for the effects of attenuation and geometry, as discussed below. The corrected amounts for each of the segments 40 of the container 1 are then summed to give the total at amount for these isotopes. From these measured results for certain isotopes the difficult to measure nuclides and overall activity can be obtained using one or more fingerprints for the waste in the container. A fingerprint is the ratio of the various isotopes to one another and is determined by a variety of physical/chemical analyses on a source of waste. A fingerprint generally applies to waste from a particular waste stream/source over a long period of time. The measured and fingerprint inferred activity information is used to complete the activity catalogue for the container. This activity information is then supplied to the storage site operator for their records and use.

The approach taken in the present invention to account for the effects of geometry and/or attenuation is to apply a correction factor to the monitored results to give a corrected result. Two principle ways for obtaining the correction factor are envisaged.

In either approach, some basic characteristics of the waste are taken into account.

The typical waste types present in uncompactable waste generally have a density of 1 gcm-3 and a density range of 0.7 gcm-3 to 1.2 gcm-3 covers most containers 1 encountered. Two key constituents of the radioactive materials encountered are Cs137 and Co60 which each present useful characteristic energy emissions. Both are strong gamma emitters, but the densities encountered in uncompactable waste give rise to significant attenuation of the emissions, so preventing all the emissions reaching the detectors 17, 19. The extent depends upon the type of waste present and density of the waste. Usefully, the gamma attenuation coefficients for most common waste materials are very similar between 400 and 1200 keV. This includes such material as steel, wood plastics, aluminum copper etc, but excludes shielding such as lead.

In either approach, some basic assumptions about the characteristics of the waste are made. These are, that the activity in a container is assumed to being evenly distributed throughout and that the waste is evenly distributed in terms of its attenuation effects. Techniques and approaches for verifying the applicability of these assumptions are discussed later.

The first approach of the present invention for obtaining the correction factor to take account of attenuation and/or geometry effects involves the determination of the correction factor using a mock up of the container and waste type of interest.

Figure 5:
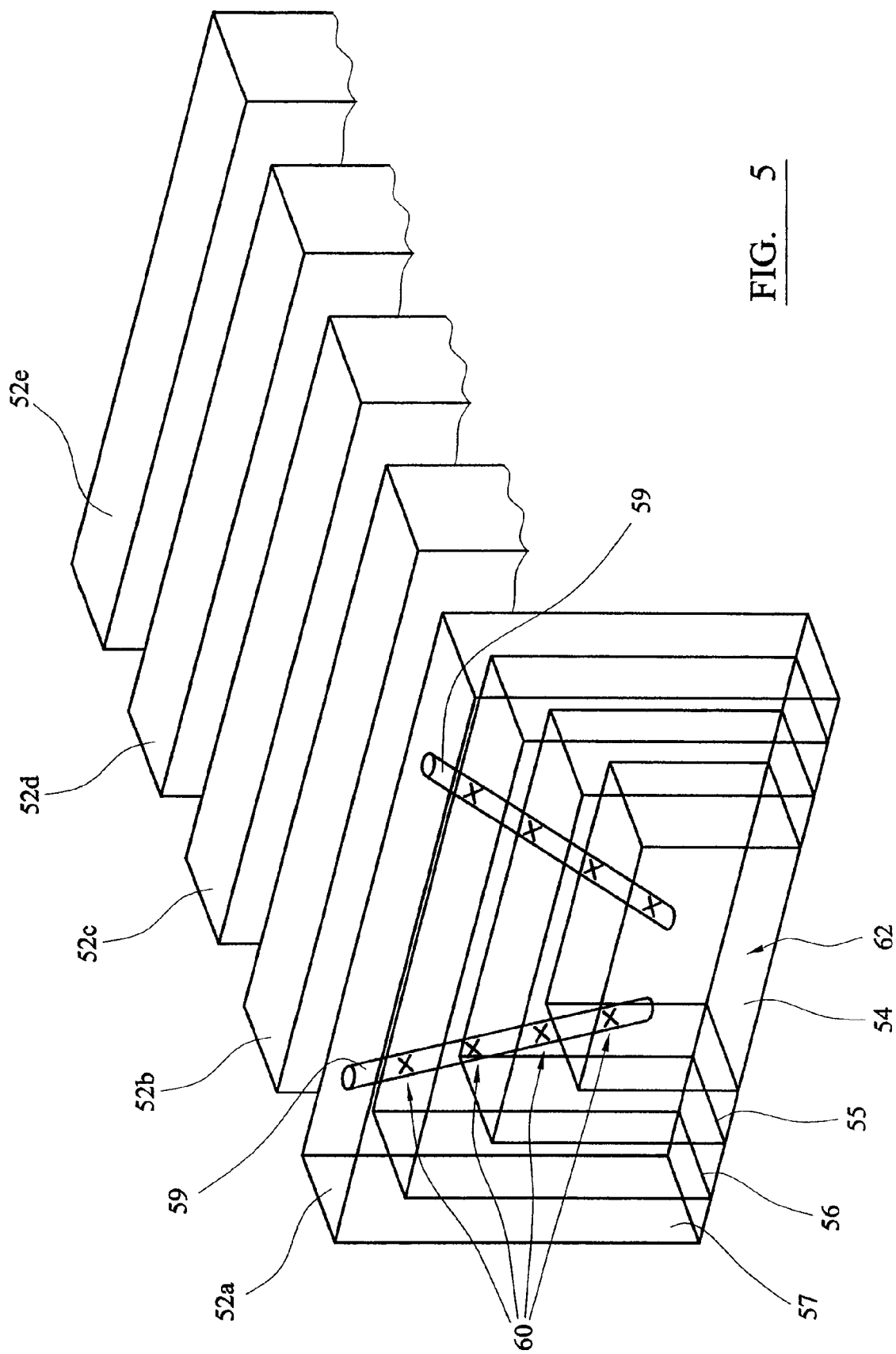
FIG. 5 schematically illustrates the equal volume calibration approach taken according to the present invention, in respect of one detector configuration.

A container of the container type of interest is loaded with representative waste, free of radioactive material, to provide a calibration container 50, FIG. 5. The volume of waste is divided into a number of segments 52 corresponding to the number that would be used to analyse the container if the waste in it were unknown. In keeping with the non-limiting description above, therefore, five segments, 52a, 52b, 52c, 52d, 52e, are used.

Each segment 52 is in turn divided into a number of volumes, each volume being equal in volume to the others. Between four and eight equal volumes are useful for this purpose, with four being used in the illustration of FIG. 5.

The shape of the four equal volumes 54, 55, 56, 57, will be different with different detector configurations and/or numbers of equal volumes. Different volume shapes would apply if detectors were present below the container and/or absent from one side, for instance. In the four detectors 17 above, one detector 19 to each side detector configuration, previously discussed, this gives the four equal volumes 54, 55, 56, 57, represented in FIG. 5. The determination of the shape of the equal volumes 54, 55, 56, 57, preferably starts with the core volume 54, that is the equal volume including the hardest to measure parts of the overall volume. In the illustrated example, this is the central bottom part of the volume as that is the greatest distance from the detectors. The subsequent equivalent volumes 55, 56, 57, are in effected layered around the core volume and reflect increasingly easy to measure equal volumes. Thus in general the outer quarter volume 57 is the surface incorporating volume close to the detectors.

In the preferred form of the invention mentioned above, the provision of bottom and top detectors means that the hardest to measure volume is that at the centre.

This use of segments and equal volumes provides a useful structure for the next part of the approach to obtaining the correction factor.

A series of reentrant tubes 59 are provided leading from the outside of the container 50 into the waste. The tubes 59 allow access to a series of positions 60 within the waste. With respect to the core volume 54 a series of positions 60 are provided, distributed throughout the core volume 54, but generally with an equal distance X between the position 60 and point 62 furthest from the detectors and the boundary 64 between the core volume 54 and the next equal volume 55. With respect to the equal volume 56, the positions 60 are again evenly distributed and at the mid point between the boundary with equal volume 55 and equal volume 57. The same tubes 59 can be used to access more than one of the positions 60.

The tubes 59 are used to provide access for the provision of a known activity source at the positions 60. With the sources in the positions 60 for one of the equal volumes, this enables measurement of the detectors response to that activity, with the activity being subjected to the geometry and attenuation effects of that position in the waste. As a result, a sensitivity factor for that volume can be obtained. It is desirable to provide sources in the matching equal volume of at least the adjacent segments, and preferably all of the segments, during the measurements for that equal volume. Around 5 to 20 sources per equal volume are desirable to fully reflect emissions from that volume. It is also desirable to perform the process using a Cs137 source and using a Co60 source.

Repeating the process for each of the equal volumes 54, 55, 56, 57, allows the sensitivity factors for all the volumes to be obtained. In effect the proportion of emissions from each volume which are detected may be established. The individual sensitivities (correction functions) may then be combined to give a single correction factor for geometry and attenuation that covers the whole of that segment. Separate correction factors are possible for all the different segments forming the overall volume. Separate correction factors are possible for different type segments forming a volume (for instance, one correction factor applying in respect of the two end segments, with a second correction factor applying in respect of all the intermediate segments—perhaps as a reflection of the different volumes of the segments in these two different type segments—the wedge shaped view of the intermediate segment may be fully occupied by waste, with the end segment being partially free of waste). In the simplest approach the same correction factor may be applied throughout the volume of waste, that is to say the same correction factor is used for each segment. The correction factor obtained can then be applied to each unknown volume of waste as it is monitored.

In pursuing this approach, due to the decreasing sensitivity of the detectors to emissions from deep within the volume (given the need to keep monitoring times practical) there may be situations in which sensitivity to emissions from the core equal volume 54 is too low for meaningful detection. In that case, the assumption that the activity is evenly distributed is used. In effect the three outer volumes are corrected using their sensitivities/correction functions and this result equals the activity for 3 out of the 4 volumes or in effect is 75% of the total activity. Of course, the fraction detected, corrected and then scaled up will depend upon the number of equal volumes used and the number of those for which the sensitivity is too low to be meaningful (for instance: 2 out of 8 equal volumes; 1 out of 10 equal volumes etc).

In tests the approach has been established to give calculated Cs137 and Co60 activity values, for worst case locations, that are <1% of the upper LLW waste limit at 90% confidence. Assuming uniform distribution of activity, then without correction, the worst case scenarios vary in response by a factor of 10 to 40. On the same basis, but with correction of the above mentioned type, variations by a factor of 3 only are obtained. This applies to both metal waste and concrete rubble waste situations.

The second approach of the present invention for obtaining the correction factor to take account of attenuation and/or geometry effects involves the determination of the correction factor using a computer simulation of the container and waste type of interest.

In this approach details of the detector type, detector sensitivity, detector positions relative to each other and to the monitoring space, field of view positions and shape, container shape, container material, container position within the monitoring space, waste shape, waste material, waste position within the monitoring space and the like are fed to a computer model. Monte Carlo Neutrons and Photons is one available package which can be set up to simulate such a situation and receive the necessary information. The information generally relates to issues of geometry (positions, views etc), to issues of attenuation (material, distances etc) and detector performance (sensitivity, collimation etc).

Having formed a model of the whole container it is possible to introduce one or more simulated sources to one or more positions within the waste and consider the detector responses thereto and hence again derive sensitivity values. The number and positions of the sources could follow the useful structure provided by the equal volume approach above (sources at mid points in an equal volume). The number and positions of the sources could be quite different, however, to reflect the versatility a simulation provides. Thus sensitivity to homogeneously dispersed sources could be simulated and/or a far larger number of sources could be simulated.

The overall result is the same, however, in that a correction factor is obtained which can be used to correct the monitored results on an unknown waste to give corrected results fully reflecting all the activity present.

In many cases it will be desirable to verify the simulation using a real world mock up of the type described above.

In the above mentioned embodiments the detectors are provided over and to the sides of the container 1. As a result, the problem volume (that furthest from the detectors) is at the centre bottom thereof, core volume 54. To address this one or more further detector could be positioned under the container, potentially without the side detectors. This would improve the accuracy of the measurement (by increasing the sensitivity of the system), change the configuration of the volumes used (the core volume would be more centrally positioned) and reduce the extent to which the core volume was a problem (the chances of a volume being too far from at least one of the detectors for there to be enough sensitivity is reduced).

In a further embodiment, it is possible to use a different detector configuration to look at the core volume. This can be achieved using a detector for which the field of view is more narrowly defined by its collimator(s) and with that field of view centred on the hardest volume. As a result, that detector's counts relate more specifically to the hardest volume, with counts from elsewhere excluded, and so allow a more accurate accounting for radioactivity in that volume.

As an extension of the above mentioned approaches a number of techniques can be used where non-uniformity of waste source (and hence applicable fingerprint) is likely or suspected.

Figure 6:
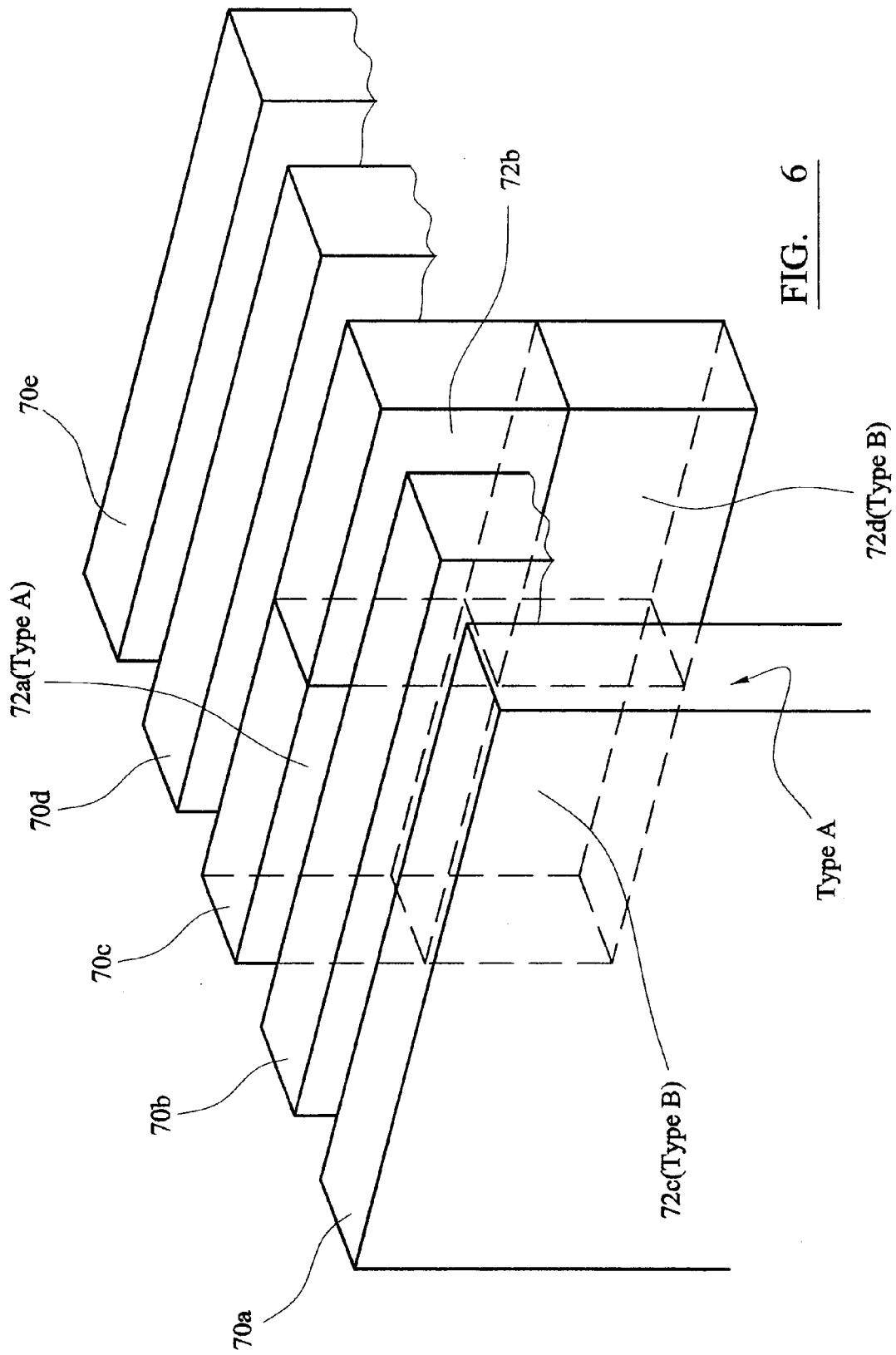
FIG. 6 schematically illustrates the allocation of different fingerprints to different segments.

As mentioned above, the measured results for certain isotopes can be used to give the results for the difficult to measure isotopes (and as a result the total activity) through the use of a fingerprints applicable to that waste. A fingerprint is the ratio of the various isotopes to one another and is determined by a variety of physical/chemical analyses on a source of waste. A further advantage of the segment based approach discussed above is that, as illustrated in FIG. 6, specific fingerprints can be assigned to each of the segments 70a, 70b, 70c, 70d, 70e, so as to further increase the accuracy of the investigation.

In practice, a low number of fingerprints may be applicable to the situation being investigated as only a low number of different waste types are involved. To take an example of a nuclear power plant, the waste type is either one with Co60 activity as the dominant form due to the waste type arising from neutron activation or is one in which Cs137 activity is the dominant form because the waste type arose as a result of fuel pin failures or fission product release.

Because of this, consideration of the measurements from the detectors when considering one segment 70a may suggest Co60 predominating and thus a first waste and thus a first fingerprint (Type A) applying. Consideration of another segment 70b may suggest Cs137 predominating and thus a second waste type and thus a second fingerprint (Type B) as being the most applicable. The fingerprint allocated to each of the segments is then used in the calculation of the difficult to measure isotopes for that segment 70. The overall container result is then a combination of the results for the different segments 70 summed together.

In other situations, other measurement results may suggest other fingerprints. Either way, segment specific correction is provided.

In an extension of this approach, the results from individual detectors 17, 19 or combinations of less than all the detectors 17, 19 can be considered to break the segments 70 up still further. Thus with respect to segment 70c this could be broken up into quadrants 72a, 72b, 72c, 72d and the nature of the activity measured for each quadrant could lead to a fingerprint specific to the waste in each. For instance, the signals from the side detector 19 and first of the top detectors could be used to interpret quadrant 72a and assign a specific fingerprint, Type A, to it. Side detector 19 along might be used for quadrant 72c at the bottom and so lead to the assignment of a Type B fingerprint.

Extending this principle still further, it is possible to record the output from each detector at each measurement segment separately and perform a deconvolution exercise, e.g. tomography, on the data set to give a voxelated image of the activity distribution. In effect the volume in the container would be broken down into many thousands of voxels. The activity associated with each small volume element, voxel, is obtained as a result and so an appropriate fingerprint specific to each voxel can be assigned and used in the calculation of the total activity etc for it. The activity for all the voxels would then be summed to give the total for the container. The voxel level approach has advantages as the voxels are discrete and without overlap, so allowing more precise allocation of fingerprints and avoiding the need for any adjustment for overlap.

As an extension of the above mentioned approaches a number of techniques can be used where non-uniformity of activity distribution is suspected and/or needs to be verified. In general these are variations of techniques mentioned above, but adapted to put them to a different purpose.

In a first of the techniques, the results from individual detectors 17, 19 or combinations of less than all the detectors 17, 19 can be considered to break the segments 70 up, for instance, into quadrants 72a, 72b, 72c, 72d as discussed above. Rather than considering the activity measured for a preponderance of Cs137 or Co60 in respect of each quadrant, the approach considers the amount of activity from the quadrant. For instance, the signals from the side detector 19 and first of the top detectors could be used to interpret quadrant 72a and the activity arising from it. The side detector 19 might be used for quadrant 72c at the bottom and the activity from it and so on. Differences in the activity between quadrants would point towards non-uniform activity being present. Furthermore, a rough indication as to the actual activity involved and/or a rough indication as to its location could be provided.

The movement of the gantry relative to the waste in effect allows a set of views of the waste to be taken from a variety of directions (top, bottom, side) and with that being repeated at a variety of different positions along the waste. Imaging of the activity and its position is thus provided.

In the second such approach, it is possible to record the output from each detector at each measurement segment separately and perform a deconvolution exercise, e.g. tomography, on the data set to give a voxelated image of the activity distribution, instead of the isotope which is in preponderance. In effect the volume in the container would be broken down into many thousands of voxels. The activity associated with each small volume element, voxel, is obtained as a result and so differences in the activity of one voxel compared with the others can be established at a very detailed level. A range of activities may be defined, with activities falling within that range being accepted as evenly distributed activity and with activities outside that range being deemed non-uniform activity distribution. The detail can of course be considered in terms of the actual level of activity for a voxel and/or the position of that voxel can be considered in detail.

As an extension of the above mentioned approaches a number of techniques can be used where non-uniformity of attenuation within the waste is suspected and/or needs to be verified. Non-uniformity of attenuation is a different issue to non-uniformity of waste source, as different sources may have different emissions associated with them, but still have the same attenuation effect as the bulk of the waste, the matrix, is the same (wood, soil etc). A number of forms of the invention for investigating attenuation variation are possible.

In a first form, the adaptation addresses the issue that even if detectors are provided below the container and are used to examine the core (hardest/problem) volume, a core volume will remains somewhere within the container. As a verification issue, or for other reasons, the attenuation properties of the core volume could be checked using this adaption. Either using another detector type, or potentially using one of the same detectors, the pairing of the detector with a transmission source is useful. The impact of the core volume on transmissions from the source can be established by comparing the transmission emissions with the detected emissions are they have interacted with the volume of waste. The source could be provided to one side with the detector to the other or with one below and one above the container. This information on the effect of the waste on the emissions would warn if high shielding material was present in the core volume and hence the results were unreliable as any emissions for that volume would be shielded more than expected. Furthermore, such a situation being found to occur over a number of runs on different containers would provide useful information that the loading of the containers was not occurring in the right way. For instance, dense waste was being dumped first in the bottom centre for ease of handling, but with this being the least desirable position for this type of waste for accuracy of measurement due to overall attenuation effects, together with the geometry effects. The information from the another detector type could be shared with the waste handler/apparatus operator or be fed only to verification personnel.

Once the above example only uses a transmission source to investigate the core volume, because high shielding material there would be of particular concern, the possibility exists to consider the whole of the container and its volume of waste in this way. To achieve this the effects of the waste lying along a number of paths through the volume are monitored. A variety of ways of considering the multiple paths exist. It is possible to move the transmission source and the detector it is paired with to a variety of positions. It is possible to move the transmission source so that it is "aimed" at the detector along a different path. It is possible to move the transmission source to a different position, with the source pairing with a different detector already in position (particularly where the detectors already exist in such positions because they were used for the initial consideration of the waste). It is possible to use multiple transmission sources paired with multiple detectors.

In a second of these approaches, it is possible to monitor and analyse two or more different energy emissions and consider the impact of the attenuation effects of the waste volume upon them. If two such energies are considered, then it is possible from reference materials and/or consideration of unattenuated sources to establish the ratio of the activity of the lower energy to the higher energy of the pair. Attenuation will effect the lower energy emissions to a greater extent than the higher energy emissions. The lower and higher energies may come from the same isotope or from different isotopes, for instance 662 keV from caesium and 1331 keV from cobalt, particularly when the fingerprint of the waste is known. For the expected materials and densities expected for the volume of waste, it is possible to establish the extent of variation in the ratio that will occur. If higher levels of attenuation occur than expected and/or are desirable for accurate monitoring using the techniques of this document, then this will preferentially reduce the lower energy compared with the higher energy emissions of the pair. Hence a ratio between the two outside of the range of ratios expected reveals that the attenuation is greater than expected.

The approach can be extended to expressed a measure of the level of attenuation based upon the ratio encountered. The approach can be extended further to provide a further correction factor for this attenuation.

The approach preferably uses a pair of energies from the same isotope so as to be confident of the unattenuated ratio and hence the impact of attenuation. More than two energies can be considered.

It is possible to combine this warning of non-uniform attenuation with the type of transmission based investigation detailed above to provide information on the position of the increased attenuation. This can be extended to a still further correction factor which accounts for the extent and position of the increased attenuation.

The solutions the present invention provides are beneficial in many respects. The technology used is based on components which have been well tested in other uses and are established as reliable. The approach is easy to use and is highly accurate. The operation is flexible in terms of the different waste stream types or fingerprints which can be accommodated and the range of different waste item types which can be accommodated. This is achieved using a reasonable assay time, for instance suited to over night use. The data generated is useful for the immediate interpretation of the waste and for subsequent analysis. Finally, the approach allows cost savings in terms of the personnel who are needed to make the determination (existing approaches require health physics personnel who are in relatively short supply and are hence expensive) as the approach does not require highly specialised personnel. High levels of cost savings are also provided through the increased utilisation of storage sites.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of monitoring a volume of waste for radioactive material, the method comprising:
    providing the volume of waste in a monitoring space;
    providing a support, the support being provided with a plurality of detectors for radioactive material;
    monitoring the volume of waste for radioactive material, in four or more parts, to give a monitoring result for each of the four or more parts;
    correcting the monitoring result for each of the four or more parts for geometry and/or attenuation to give a corrected result for each of the four or more parts using a separate correction factor for each of the four or more parts;
    wherein the separate correction factor for each of the four or more parts of the volume of waste is obtained by a method comprising:
    providing a simulation, the simulation having an equivalent volume as the volume of waste, the simulation including a simulation part corresponding to each of the four or more parts of the volume of waste, the equivalent volume of the simulation being free of radioactive material;
    providing the simulation in an equivalent monitoring space, with equivalent detectors, to those used for the volume of waste;
    dividing one or more of the simulation parts into two or more volumes which are equal to give two or more equal volumes;
    providing a known activity radioactive source at one or more positions in more than one of the equal volumes of one of the simulation parts provided by the simulation; and
    determining a detector response for one or more of the detectors to the known activity source in one of the one or more positions, a comparison of the detector response and known activity contributing to an equal volume correction function for that equal volume, one or more such equal volume correction functions providing the separate correction factor for the part.

2. A method according to claim 1 in which the simulation is a computer simulation.

3. A method according to claim 1 in which the simulation is a physical simulation.

4. A method according to claim 1 in which one of the equal volumes is a core equal volume, the core equal volume being that volume to which the detectors are least sensitive.

5. A method according to claim 4 in which the core equal volume is defined in terms of the volume bounded by a given minimum distance from all the detectors.

6. A method according to claim 4 in which the other equal volumes are defined as that volume which is all between a first given minimum distance and a second given minimum distance from all the detectors, the first and second distances varying for the different equal volumes.

7. A method according to claim 1 in which the other equal volumes are defined in layers around the core equal volume.

8. A method according to claim 1 in which the shape of the equal volumes is defined relative to that location separated from all of the detectors by the greatest distance.

9. A method according to claim 8 in which the greatest distance is the greatest distance through the waste and/or container therefor.

10. A method according to claim 8 in which the equal volume containing that location is the core equal volume.

11. A method according to claim 1 in which the method is repeated with a number of different known activity sources.

12. A method according to claim 11 which includes the use of a $Cs^{137}$ source and a $Co^{60}$.

13. A method according to claim 1 in which the positions are evenly distributed throughout an equal volume.

14. A method according to claim 1 in which between 5 and 20 positions are provided for each equal volume.

15. A method according to claim 1 in which one or more of the positions are at locations equidistant from the boundary of the equal volume with the next equal volume out and the boundary of the equal volume with the next equal volume in.

16. A method according to claim 1 in which one or more of the positions are at locations equidistant from the boundary of the equal volume with the next equal volume out and the location with the greatest minimum distance from all detectors.

17. A method according to claim 1 in which one or more of the positions are at locations equidistant from the boundary of the equal volume with the next equal volume in and the outside boundary of the equal volume.

18. A method according to claim 1 in which the positions are accessed using one or more tubes provided in the simulation.

19. A method according to claim 18 in which a tube provides access to one or more of the equal volumes.

20. A method according to claim 1 in which all equal volumes are considered using a known activity source.

21. A method according to claim 1 in which the comparison is of the calculated or monitored response without the simulation present compared with the simulation present.

22. A method according to claim 1 in which the separate correction factor for one of the four or more parts is a combination of all the equal volume correction functions for that part.

23. A method according to claim 1 in which a single separate correction factor for each part is provided.

24. A method according to claim 1 in which the simulation accounts for one or more of: detector type, detector sensitivity, detector positions relative to each other, detector positions relative to the monitoring space, field of view positions and shape, container shape, container material, container position within the monitoring space, waste shape, waste material, waste position within the monitoring space.

25. A method according to claim 1 in which the simulation accounts for one or more of: the factors involved in the detection of emissions due to issues of geometry, the factors involved in the detection of emissions due to issues of attenuation, the factors involved in the detection of emissions due to issues of detector performance, the factors involved in the detection of emissions due to apparatus performance.

26. A method according to claim 1 in which the simulation includes introducing one or more known activity sources to one or more positions within the simulation and consider the detector responses thereto.

27. A method according to claim 26 in which sensitivity values are derived from the detector response.

28. Apparatus for monitoring a volume of waste for radioactive material, the apparatus comprising:
a support, the support being provided with a plurality of detectors for radioactive material;
a monitoring space in which the volume of waste is provided and in which the volume of radioactive waste is monitored in four or more parts;
a data processor for calculating a monitoring result for each of the four or more parts, for correcting the monitoring result for each of the four or more parts for geometry and/or attenuation to give a corrected result for each of the four or more parts and for providing a separate correction factor for correcting each of the four or more monitoring result to give the corrected result therefore;
wherein the separate correction factor for each of the four or more parts of the volume of waste is obtained by a method comprising:
providing a simulation, the simulation having an equivalent volume as the volume of waste, the simulation including a simulation part corresponding to each of the four or more parts of the volume of waste, the equivalent volume of the simulation being free of radioactive material;
providing the simulation in an equivalent monitoring space, with equivalent detectors, to those used for the volume of waste;
dividing one or more of the simulation parts into two or more volumes which are equal to give two or more equal volumes;
providing a known activity radioactive source at one or more positions in more than one of the equal volumes of one of the simulation parts provided by the simulation; and
determining a detector response for one or more of the detectors to the known activity source in one of the one or more positions, a comparison of the detector response and known activity contributing to an equal volume correction function for that equal volume, one or more such equal volume correction functions providing the separate correction factor for that part.

29. Apparatus according to claim 28 in which the simulation is a computer simulation.

30. Apparatus according to claim 28 in which the simulation is a physical simulation.

* * * * *